Sept. 29, 1959  J. JARRET ET AL  2,906,525
DEFORMABLE HYDROSTATIC SYSTEM
Filed April 10, 1956
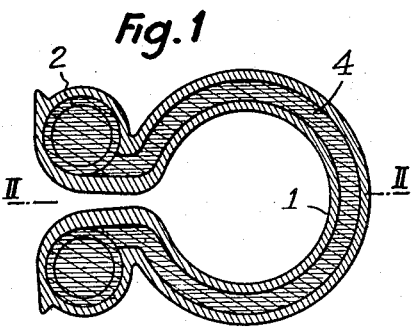
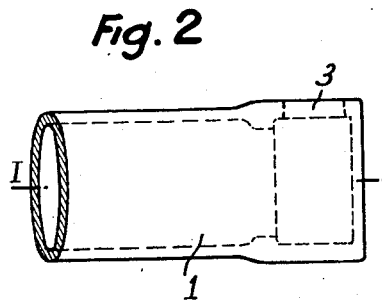
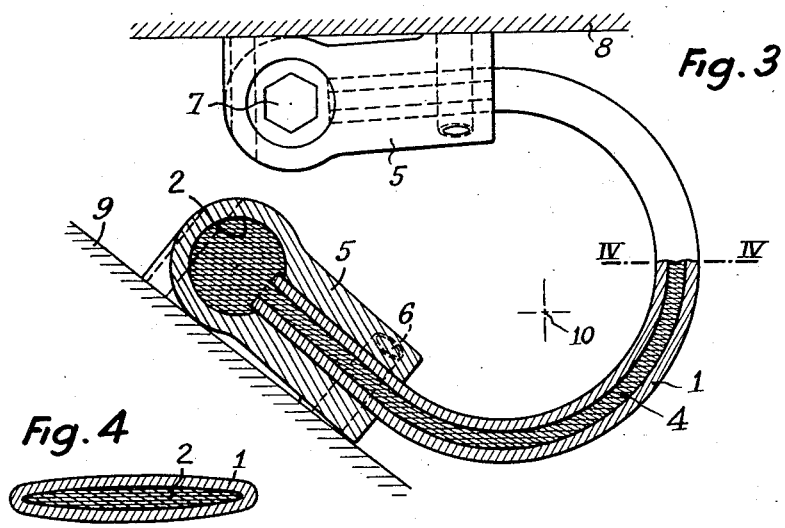
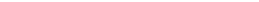
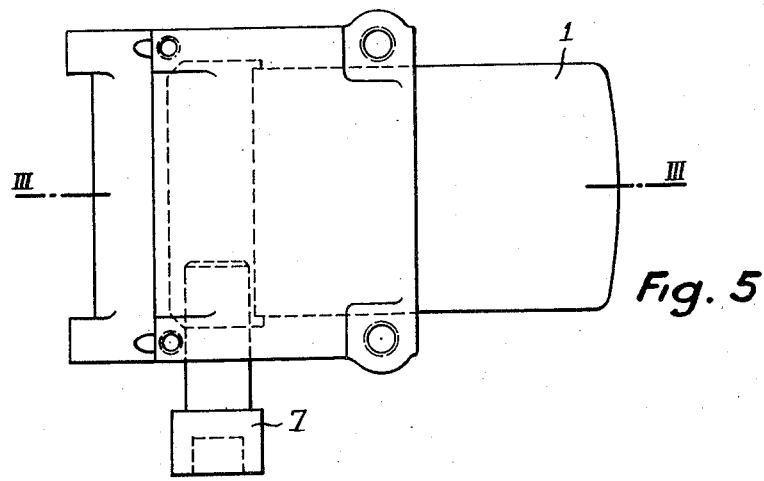

United States Patent Office 2,906,525
Patented Sept. 29, 1959

2,906,525

DEFORMABLE HYDROSTATIC SYSTEM

Jean Jarret and Jacques Jarret, Saint Cloud, France

Application April 10, 1956, Serial No. 577,257

Claims priority, application France April 12, 1955

7 Claims. (Cl. 267—2)

This invention relates to deformable hydrostatic systems of the type described e.g. in U.S. Patent No. 2,800,321, granted December 2, 1957. Such systems are generally usable as spring devices, dampers, shock-absorbers and for similar purposes.

Systems of this kind may comprise a deformable, variable volume sealed enclosure or casing containing a body of a deformable substantially incompressible material such as a liquid, e.g. oil or water, or a suitable solid such as an elastomer. Moreover in the above mentioned patent such systems are described wherein the enclosure is so constructed that it is devoid of any parts in frictional engagement during the deformations thereof, thereby reducing the danger of an imperfect seal in cases where the contained material is a liquid, and preventing a binding of the parts if the material used is an elastomer. For this purpose the enclosure or casing may be provided in the form of a metallic bellows.

It is known moreover that where such a system is to be used for damping and shock absorbing purposes the volume variation throughout the body of the material should be made to be non uniform, and for this purpose part of the casing is made highly deformable while another part is substantially less deformable or is rigid. Thus, such systems have been described wherein the deformable portion is in the form of a bellows and the rigid portion is in the form of a constant-capacity casing affixed to and communicating with said bellows.

It is a general object of this invention to provide an improved deformable hydrostatic system of the character described, suitable for a variety of uses and particularly as shock absorbers for damping the relative movements of parts of a vehicle or craft. A more specific object is to provide an improved shape of variable volume casing for such a hydrostatic system which will be both strong and efficient and yet easy and inexpensive to produce. A further object is the provision of simple and efficient pressure adjusting means for such a hydrostatic system. Another object is to provide a deformable hydrostatic system of improved shape suitable as a shock absorber for damping both rectilinear and angular relative displacements between two structures. Other objects will appear hereinafter.

With the above objects in view our invention provides basically a deformable hydrostatic system comprising a tubular member having a substantially elongated cross sectional contour, and formed to an arcuate configuration in a plane normal to the major dimension of said contour, means sealing said tubular member to define a sealed enclosure, and a body of a relatively incompressible deformable substance, such as a liquid or elastomer, filling the enclosure.

In response to external forces or torques applied to the ends of the tubular casing, the curvature radius thereof will vary resiliently thereby varying the volume of the enclosure defined by said casing.

The cross sectional contour of the tubular member or casing may be rectangular with a high length to width ratio, and its ends are preferably rounded off or flattened out. Or the contour may be oval or elliptical; thus it may comprise a pair of circular arcs each extending over an angle of e.g. from 20 to 60°.

The arcuate configuration of the tubular member as a whole is preferably greater than half a circumference, and may extend say from 180 to 320°. The curvature radius of the arc should be suitably selected with regard to the wall thickness so that the tube wall will be able to withstand the high internal pressures developed during deformations. Thus we may indicate that with a tubular member having a wall thickness on the convex side thereof of about 3 mm., and with a maximum internal pressure of 6 kg. per square millimeter, and further assuming that the strain in the tube wall should not exceed 60 kg. per square millimeter, then the radius of curvature should be selected not greater than $$\frac{3 \times 60}{6} = 30 \text{ millimeters}$$

however the radius may be somewhat increased if the cross sectional contour has a high transverse curvature.

For shock absorber or damper applications, a non deformable casing may be connected to one end, or to each end, of the tubular member, the capacity of said casing being preferably greater than that of the tubular member, some of the liquid or elastomer will flow from the tube to the casing or casings, or from the casing or casings into the tube and exert a damping action. The opening or openings connecting the tubular member and casing or casings may be a wide opening if the incompressible material contained therein is an elastomer, or it may be a restricted calibrated orifice in case said material is a liquid.

The tubular casing of the invention may be produced directly molded or may be produced by drawing, forging or press forming; the end reservoir or rigid casing connected therewith may be molded integrally with the tubular portion or may be produced separately and fitted to the ends of the forged or otherwise formed tube.

The operating forces and loads may be transmitted to the system of the invention either directly to the casing or through intermediate mechanism such as pivots, fulcrums, leverage, links, and the like.

Where the hydrostatic system of the invention is designed for use in connection with angular displacements, such as for the suspension of a vehicle wheel journalled on a pivoted arm, one end of the casing may be rigidly secured to the movable part (e.g. wheel supporting arm) and the other end to the stationary part (vehicle chassis), and the arrangement is preferably such that the center of rotation of the angular displacement between the two parts substantially coincides with the center of relatively angular displacements between the ends of the tubular casing in the natural deformations thereof, i.e. with the tubular casing in an unattached condition. This will minimize reaction forces and consequent friction disturbances and other causes of mechanical fatigue and strain.

Adjusting means are preferably provided in the form of a screw plug threaded in an orifice formed in the tubular casing or in one or each of the rigid end casings, for adjusting the degree of compression in the enclosure.

Two exemplary embodiments of the invention will now be described for purposes of illustration but not of limitation, with reference to the accompanying drawings, wherein:

Fig. 1 is a sectional view on line I—I of Fig. 2 and shows one embodiment of improved hydrostatic deformable system;

Fig. 2 is a section on line II—II of Fig. 1;

Fig. 3 illustrates another embodiment and is partly an elevational view and partly a section on line III—III of Fig. 5;

Fig. 4 is a section on line IV—IV of Fig. 3; and

Fig. 5 is a corresponding plan view.

As shown in Figs. 1 and 2, an hydrostatic spring unit comprises a tubular body 1 having an elongated oval cross section as shown in Fig. 2, the cross sectional contour being formed by two circular arcs each about 30° in angular extent and smoothly interconnected at their opposite ends. The tubular body 1 is curved in a plane substantially normal to the major axis of the oval cross section, to form a nearly complete circumference, say about 300° in angular extent.

The tubular body thus provided is connected at each end to a rigid tank or reservoir section 2 each having a greater capacity than that of the body and formed with a filling orifice 3, and the entire casing thus provided is filled with a body of a suitable elastomer 4. The casing thus described may be formed from any suitable high resistance material, such as a high-tensile steel having an elastic yield point in a range of say from 80 to 150 kg. per square millimeter.

Assuming that the end portions of the tube 1 are moved in towards each other by a force acting on one or on each end of the tube, the radius of curvature of the tube will decrease, resulting in a decrease in the volume encompassed by the casing so that the elastometer contained therein is compressed. As a result of such deformation therefore part of the elastomer will flow from the tube 1 into the end reservoir section 2, so that the device will act as a damper. The variations in volume caused by elastic deformations of the arcuate tube 1 may amount to about from 2% to 10% of the total capacity of the tube. The maximum pressures to which the elastomer may be subjected during such operation may be in an approximate range of from 200 to 1200 kilograms per square centimeter.

In the alternative embodiment shown in Figs. 3 to 5, the spring device comprises a tube 1 having an elongated cross section visible in Fig. 4, filled with a body of elastomer 4, and here also the curvature of the tube is in a plane normal to the major axis of the cross sectional oval. End portions of the tube are force fitted into respective steel members 5 in each of which an enlarged chamber 2 is formed. Filling orifices fitted with screw plugs 7 are provided in one end of chamber 2, rotation of the plug members 7 being adapted to adjust the capacity of the chamber and control the degree of compression of the elastomer so as to control the elastic rate and damping action of the device.

The embodiment now being described is designed for the purpose of damping angular displacements of two relatively movable parts, e.g. a fixed part or frame 8 such as the chassis of a vehicle, and a movable suspended part 9 such as a pivoted arm supporting a wheel of the vehicle. The sleeves 5 are rigidly secured to the parts 8 and 9 respectively, e.g. with bolts such as 6. The wheel supporting arm or lever 9 has a pivotal center 10 which is located at or close to the centre of rotation involved in the natural deformations of the arcuate tube 1 in the free or unattached condition of the hydrostatic device. Owing to this feature the reactions of the spring device and the resulting frictional forces, are minimized during the elastic deformations of the device.

Adjustment of the screw plug 7 provided in at least one of the end sleeve members permits accurate adjustment of the compression rate and damping action of the device.

It will be understood that the invention may be embodied in other forms than the two illustrated by way of example.

What we claim is:

1. A deformable hydrostatic system comprising a tubular member having a substantially elongated cross sectional contour and formed to an arcuate configuration in a plane normal to the major dimension of said contour, rigid casing means having a cavity of greater capacity than that of the tubular member to increase the flexibility of said member connected with at least one end of said tubular member and defining a sealed enclosure therewith, and a body of a relatively incompressible deformable substance filling said enclosure for resilient deformation of said tubular member in response to forces applied thereto substantially in said plane.

2. A system as claimed in claim 1, wherein said substance comprises an elastomer.

3. A deformable hydrostatic system comprising a tubular member having a substantially elongated cross sectional contour and formed to an arcuate configuration in a plane normal to the major dimension of said contour for resilient deformation of said member in said plane, rigid casing means having a cavity connected with at least one end of said tubular member and having a capacity at least as great as the capacity of said member and defining a sealed enclosure therewith, and an elastomer filling the enclosure formed by said tubular member and the cavity in said casing means.

4. A hydrostatic system for damping the relative displacements of relatively displaceable parts, comprising a tubular member having a substantially elongated cross sectional contour and formed to an arcuate configuration extending over a major part of a complete circumference in a plane normal to the major dimension of said contour, rigid casing means connected with at least one end of said member and having a cavity of greater capacity than that of the tubular member to increase the flexibility of said member communicating with the cavity of said member and defining a sealed enclosure therewith, an elastomer filling the sealed inclosure defined by said tubular member and said casing means, and means connecting the opposite ends of said member with said respective parts for resilient deformation of said member on relative displacement of said parts.

5. A hydrostatic system for damping the relative displacements of two parts angularly displaceable with respect to each other about a center of rotation, comprising a tubular member having a substantially elongated cross sectional contour and formed to an arcuate configuration extending over a major part of a complete circumference in a plane normal to the major dimension of said contour, said member being adapted for resilient angular deformation of the ends thereof about a center of angular deformation in response to forces applied to said ends in said plane, and means connecting the opposite ends of said member with said respective parts in such positions that said center of angular deformation of the member will substantially coincide with the center of rotation of said parts.

6. A system as claimed in claim 2, including means for adjusting the degree of pressure of said substance within said enclosure.

7. In a system as claimed in claim 2, an orifice in a wall of said enclosure and a screw plug means threaded in said orifice for adjusting the degree of pressure of said substance within said enclosure.

References Cited in the file of this patent

UNITED STATES PATENTS

| 9,163 | Bourdon | Aug. 3, 1852 |
| 647,164 | Staaf | Apr. 10, 1900 |
| 2,681,800 | Taylor | June 22, 1954 |
| 2,729,440 | Wales | Jan. 3, 1956 |

FOREIGN PATENTS

| 569,919 | Great Britain | June 14, 1945 |